No. 687,619. Patented Nov. 26, 1901.
J. T. COUSE.
UTENSIL FOR PRESERVING MILK AND BUTTER.
(Application filed Mar. 28, 1901.)
(No Model.)
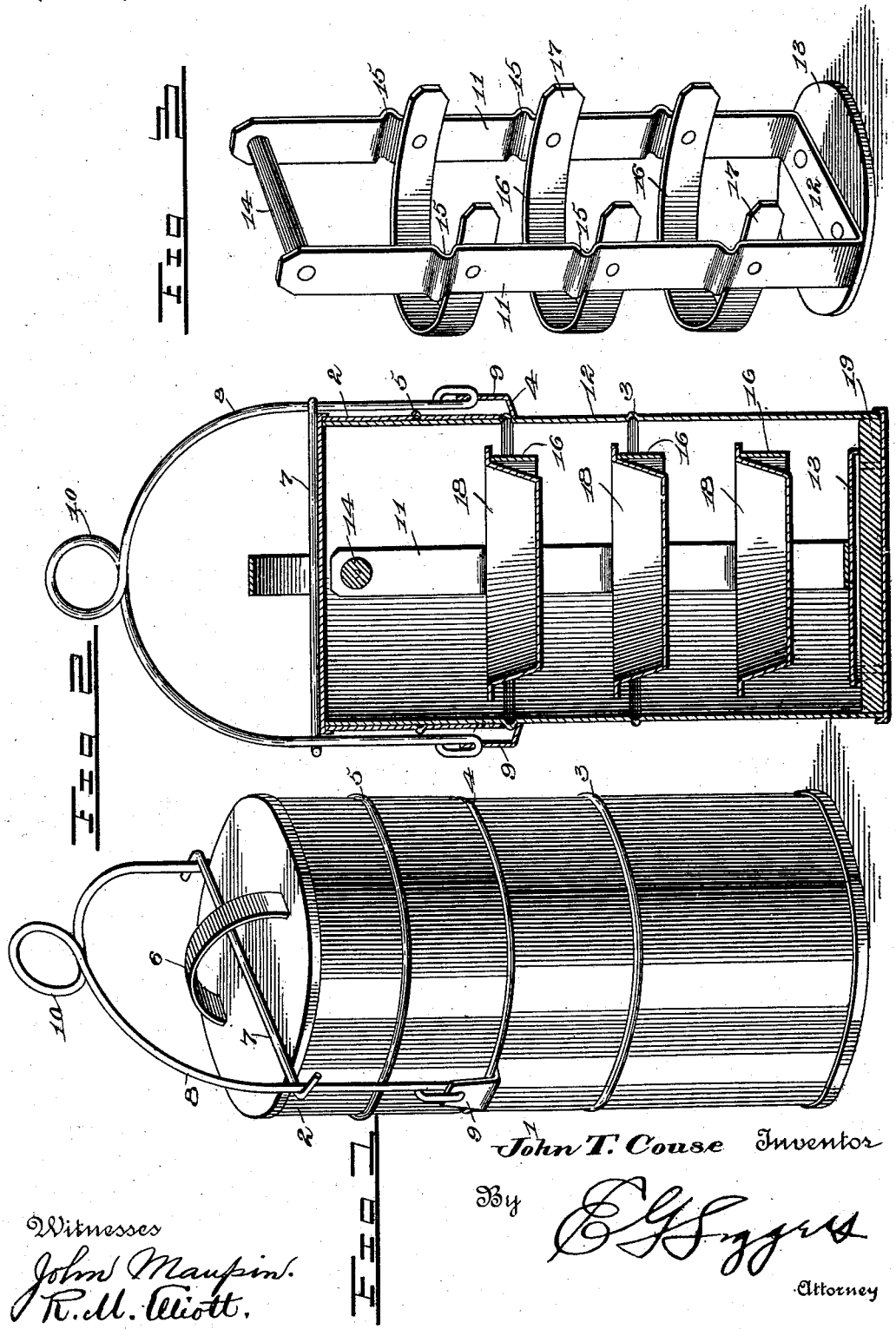
Witnesses
John Maupin.
R. M. Elliott.
John T. Couse Inventor
By
Attorney
THE NORRIS PETERS CO., PHOTO-LITHO., WASHINGTON, D. C.

UNITED STATES PATENT OFFICE.

JOHN TICE COUSE, OF COCHRAN, GEORGIA.

UTENSIL FOR PRESERVING MILK AND BUTTER.

SPECIFICATION forming part of Letters Patent No. 687,619, dated November 26, 1901.

Application filed March 28, 1901. Serial No. 53,265. (No model.)

*To all whom it may concern:*

Be it known that I, JOHN TICE COUSE, a citizen of the United States, residing at Cochran, in the county of Pulaski and State of Georgia, have invented a new and useful Utensil for Preserving Milk and Butter, of which the following is a specification.

This invention relates to utensils for preserving milk and butter.

The object of the invention is in a simple and thoroughly efficient manner, with or without the direct employment of ice or of chemicals, to keep milk and butter fresh and sweet for the maximum period of time.

The expression "without the employment of ice or chemicals" is to be understood as meaning that ice or chemicals are not used within the utensil for cooling purposes, it being obvious, however, that ice or chemicals could be employed on the exterior of the utensil for cooling or refrigerating purposes without departing from the spirit of the invention.

The results attained in the employment of this device are secured by excluding atmospheric air from the utensil or receptacle and keeping the air contained within the receptacle at the requisite low degree of temperature by partly or wholly immersing the utensil in water, which may be naturally cool or be artificially cooled, as by ice. By hermetically sealing the utensil against intrusion of atmospheric air and keeping it cool or cold contamination of any contained article or injury to its flavor or taste, as from foreign matter contained in the ice or emanating from a chemical, is effectually obviated.

With the objects stated in view the first part of my invention consists, generally stated, in a can-like receptacle provided with a tight-fitting lid, the receptacle to be of any suitable material, preferably of non-corrosive metal, such as galvanized iron. If preferred, tin may be employed, having applied thereto a paint or coating of some substance that will protect the tin against rust. The receptacle is provided with a plurality of circumferential beads or flanges which may be formed by striking up the metal or by securing thereto suitably-shaped bands for the purpose, the object of these beads being to determine the amount of water to be placed in the bucket or the like in which the receptacle may be placed. The lid of the receptacle is provided with the usual handhold and in addition a locking or clamping device, the same to engage with a bail attached to the body of the receptacle and operating to hold the bail in a vertical position to permit of ready removal of the receptacle from the water. To cause the receptacle to remain in a vertical position when placed in the water and when not containing any material to be preserved, a weight may be employed to rest on the bottom of the receptacle or, if preferred, it may be secured either on the inside or the outside of the bottom.

The second part of my invention consists, generally stated, in a supporting-rack for the receptacles containing the milk or butter to be cooled. The rack herein illustrated is one of many that may be employed, and from a standpoint of simplicity and effectiveness in operation a structure substantially like that shown will be preferred. The rack comprises two standards carrying open-sided semicircular pan-supports, the standards, by preference, being formed with guides or recesses in line with the upper edges of the pan-supports. The guides in this instance are formed by bending or striking up the material of the standards for the purpose. It will be understood that I do not limit myself to this precise arrangement, as the standards may be straight and the guides formed of separate pieces of metal attached thereto. The two standards are here shown as connected by a base-piece, which may be integral with the standards, as shown, or be a separate piece of metal suitably secured thereto, the base-piece being attached to a circular base-plate to rest on the bottom of the receptacle. The cross-diameters of the pans or holders for the material to be cooled is to be less than that of the receptacle, so that there will be ample space between the sides of the receptacle and the pans and holders for circulation of the contained air in the same manner as in an ordinary refrigerator.

The invention consists, finally, in the novel construction and combination of parts of the utensil for preserving milk and butter, as will be hereinafter fully described and claimed.

In the accompanying drawings, forming a part of this specification, and in which like numerals of reference indicate corresponding parts, I have illustrated a form of embodiment of my invention for carrying my procedure into effect, it being understood that other forms of embodiment thereof may be employed without departing from the spirit of the invention, and in these drawings—

Figure 1 is a view in perspective of the utensil as it appears when in use, the bail being shown in locked vertical position. Fig. 2 is a view in vertical transverse section, exhibiting the relation existing between the receptacle and the pan-supporting rack when the latter is *in situ*. Fig. 3 is a detached detail view in perspective of the pan-supporting rack.

Referring to the drawings, 1 designates the body of the receptacle, and 2 the lid or cover. The body of the receptacle is provided in this instance with two circumferential bands or beads 3 and 4, the bead 4 constituting also a stop to limit the downward movement of the lid or cover 2, the cover also being provided with a circumferential band or bead 5. These bands or beads constitute water-gages and may be formed by rolling or by attaching to the exterior of the receptacle and the lid a strip of metal suitably shaped in cross-section for the purpose designed. The objects of these bands or beads is to indicate visually the depth to which the receptacle is to be sunk in water when used for cooling purposes, as will presently appear. The lid or cover of the receptacle is provided with a curved handhold 6, as usual, and in addition with the transverse clamping-bar 7, the ends of which are bent approximately at right angles to each other in a plane horizontal with the top of the lid and engage with a bail 8, secured to suitable ears 9, attached to the body of the receptacle. By means of the clamping-bar the bail 8 will be held in a vertical position when placed in a bucket or tub of water, so that the utensil may be readily removed therefrom without necessitating the wetting of the hands. If preferred, the bail may be provided with a loop 10, by which the bucket may be hung up when not in use.

The pan-supporting rack 4 comprises two standards 11 and a base-piece 12, the latter by preference being integral with the standards, although, if preferred, it may be made separate therefrom and attached thereto, the base-piece being attached to a circular base-plate 13, the same in use to rest upon the bottom of the utensil, the upper ends of the standards being connected rigidly by a cross-bar or handle 14. Each standard is provided with a plurality of guides or recesses 15, which, as shown in Fig. 3, are formed by bending the standards 11 into semicircular loops for the purpose; but it is to be understood that I do not limit my invention to the formation of these guides from the standard, as it will be obvious that the standards may be made straight and the guides made of separate pieces of metal and attached thereto. Secured in this instance to the inner surfaces of the standards and with their edges in alinement with the lower wall of the guides are a plurality of pan-supports 16, the same being composed of a piece of metal bent to a semicircular shape, the ends of the supports projecting beyond the front of the standard, as at 17, to assist in guiding the pans 18 to seat upon the pan-supports, the pans in this instance being shown as provided with flanges to rest upon the supports. These pans may be made of metal or of any other suitable material and of course form no part of the present invention.

In employing the device the pans containing milk or butter are placed upon the supporting-rack in the manner described. The rack is then placed within the receptacle and the lid pushed to seat with the clamping-bar in engagement with the bail. The utensil is then placed in a bucket or tub and water is supplied thereto according to the amount of milk or butter contained in the utensil. Thus if the rack contains but one pan of milk or butter it will only be necessary to fill the tub or bucket with water up to the first bead, if two pans are filled to the second bead, and if three pans are to be filled to the third bead. When the water reaches the second bead, the utensil is hermetically sealed against intrusion of air from without. As stated in the first part of this specification, ordinary cold water may be employed for cooling processes; but it is to be understood that I may employ ice in the water or any chemical that will lower the temperature of the water.

To obviate any tendency of the receptacle to float when the rack is removed, I may employ a weight 19, which may be placed loosely on the bottom of the receptacle or may be secured thereto either on its inside surface or its outside surface.

While I have shown the supporting-rack as provided with only three sets of guides, thus providing only for three pans for holders, it is to be understood that I may employ any number of pan-supports or even less than three, if desired. Where the number of panholders is increased, the beads on the receptacle will also be increased.

When the rack is to be removed from the receptacle, the lid is raised a slight distance and turned partly around, when the bail will drop free of the projections on the clamping-bar, and the lid may then be entirely removed.

Having thus described the invention, what I claim is—

1. A utensil for preserving milk and butter, comprising, in part, a can-like receptacle provided with a tight-fitting lid, the receptacle and lid being provided with a plurality of circumferential beads or flanges suitably spaced apart and serving as water-gages, a bail carried by the body of the receptacle, and a clamping-bar carried by the lid of the receptacle and having hooked or bent ends arranged at right angles to each other and in a plane horizontal with the top of the lid, the hooked or bent ends to engage the bail to hold the same in a vertical position, substantially as described.

2. In a utensil for preserving milk and butter, a pan-supporting rack comprising standards provided on their opposed faces with guides or ways, and semicircular pan-supports secured to the standards with their upper edges in alinement with the guides or ways.

3. In a utensil for preserving milk and butter, a pan-supporting rack comprising two standards connected by a cross-piece, the standards being provided with guides or ways, semicircular pan-supports secured to the standards and having their upper edges in alinement with the guides or ways, the ends of the pan-supports projecting beyond the standards to serve as guides.

4. In a utensil for preserving milk and butter, a pan-supporting rack comprising a rectangular open structure having its sides bent or struck up to present guides, and semicircular pan-supports secured to the inner faces of the standards and having their ends projecting beyond the same, the upper edges of the supports being in alinement with the guides.

5. In a utensil for preserving milk and butter, a pan-supporting rack comprising standards provided on their opposed faces with guides or ways, semicircular pan-supports secured to the standards with their upper edges in alinement with the guides or ways, a base-plate to which the rack is secured, and a cross-bar securing the upper ends of the standards together.

6. In a utensil for preserving milk and butter, a pan-supporting rack comprising two standards connected by a cross-piece, the standards being provided with guides or ways, semicircular pan-supports secured to the standards and having their upper edges in line with the guides or ways, the ends of the pan-supports projecting beyond the standards to serve as guides when the pans containing the matter to be preserved are placed upon the pan-supports, a base-plate carried by the lower portion of the standards, and a cross-bar connecting the upper portions of the standards.

7. In a utensil for preserving milk and butter, a pan-supporting rack comprising a rectangular open-ended structure having its sides bent or struck up to present guides, semicircular pan-supports secured to the inner faces of the standards and having their ends projecting beyond the same, the upper edges of the supports being in line with the guides, a base-plate secured to the lower portion of the standards, and a cross-bar connecting the upper ends of the standards.

8. A utensil for preserving milk and butter comprising a can-like receptacle provided with a tight-fitting lid or cover, the receptacle and cover having a plurality of circumferential beads or flanges constituting water-gages, and a pan-supporting rack adapted to be contained by the receptacle, the rack carrying pan-supports spaced apart a distance equal to the distance between the beads or flanges, and having guides in line with the upper edges of the pan-supports.

In testimony that I claim the foregoing as my own I have hereto affixed my signature in the presence of two witnesses.

JOHN TICE COUSE.

Witnesses:
B. J. WYNNE,
L. F. HASKINS.